(12) United States Patent
Becker et al.

(10) Patent No.: US 11,378,765 B2
(45) Date of Patent: Jul. 5, 2022

(54) INTRA DATA CENTER AND INTER DATA CENTER LINKS USING DUAL-WAVELENGTH MULTIMODE/SINGLEMODE MULTI-CORE FIBER

(71) Applicant: Mellanox Technologies, Ltd., Yokneam (IL)

(72) Inventors: Donald Becker, Hashmonaim (IL); Dimitrios Kalavrouziotis, Papagou (GR); Boaz Atias, Maale Adumim (IL); Itshak Kalifa, Bat Yam (IL); Tamir Sharkaz, Kfar Tavor (IL); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/928,045

(22) Filed: Jul. 14, 2020

(65) Prior Publication Data
US 2021/0364718 A1    Nov. 25, 2021

(30) Foreign Application Priority Data

May 25, 2020   (GR) .............................. 20200100276

(51) Int. Cl.
| H04J 14/04 | (2006.01) |
| G02B 6/43 | (2006.01) |
| G02B 6/02 | (2006.01) |
| H04J 14/02 | (2006.01) |
| H04B 10/2581 | (2013.01) |
| G02B 6/42 | (2006.01) |
| H04B 10/25 | (2013.01) |

(52) U.S. Cl.
CPC ........... *G02B 6/43* (2013.01); *G02B 6/02042* (2013.01); *G02B 6/4202* (2013.01); *H04B 10/2581* (2013.01); *H04J 14/02* (2013.01); *H04B 10/25* (2013.01); *H04J 14/04* (2013.01)

(58) Field of Classification Search
CPC .... G02B 6/43; G02B 6/02042; G02B 6/4202; G02B 6/4249; H04J 14/02; H04J 14/04; H04B 10/2581; H04B 10/25
USPC .................................. 398/43–103, 140–172
See application file for complete search history.

(56) References Cited

U.S. PATENT DOCUMENTS

| 5,905,838 A | 5/1999 | Judy et al. |
| 6,976,792 B1 | 12/2005 | Cohen et al. |
| 8,355,638 B2 | 1/2013 | Essiambre et al. |
| 8,488,921 B2 | 7/2013 | Doany et al. |

(Continued)

OTHER PUBLICATIONS

Liu et al, Graded index seven core fiber optimized for high density, Jun. 2018, OFC, W3C.5.pdf, All Document. (Year: 2018).*

(Continued)

*Primary Examiner* — Dibson J Sanchez
(74) *Attorney, Agent, or Firm* — Kligler & Associates Patent Attorneys Ltd (57) ABSTRACT

A universal multi-core fiber (UMCF) interconnect includes multiple optical fiber cores and a shared cladding. Each of the optical fiber cores is configured to convey first optical communication signals having a first carrier wavelength using multi-mode propagation, and to convey second optical communication signals having a second carrier wavelength using single-mode propagation. The shared cladding encloses the multiple optical fiber cores.

6 Claims, 4 Drawing Sheets

(56) References Cited

U.S. PATENT DOCUMENTS

| | | |
|---|---|---|
| 8,503,845 B2 | 8/2013 | Winzer et al. |
| 8,725,001 B2 | 5/2014 | Fini et al. |
| 8,811,787 B2 | 8/2014 | Feuer |
| 9,007,681 B2 | 4/2015 | Zhu |
| 9,264,171 B2 | 2/2016 | Chang et al. |
| 9,485,048 B2 | 11/2016 | Liboiron-Ladouceuer et al. |
| 9,678,270 B2 | 6/2017 | Bigot et al. |
| 9,917,672 B2 | 3/2018 | Jensen et al. |
| 9,971,111 B1 | 5/2018 | Hsu |
| 2003/0021551 A1 | 1/2003 | Carpenter et al. |
| 2005/0135732 A1 | 6/2005 | Crow et al. |
| 2010/0284691 A1* | 11/2010 | Zottmann .......... H04Q 11/0005 398/49 |
| 2010/0329671 A1* | 12/2010 | Essiambre ............... G02B 6/14 398/44 |
| 2011/0141555 A1 | 6/2011 | Fermann et al. |
| 2011/0235972 A1* | 9/2011 | Ruggiero ............. G02B 6/2817 385/35 |
| 2011/0274398 A1* | 11/2011 | Fini .................... G02B 6/02042 385/124 |
| 2011/0274435 A1 | 11/2011 | Fini et al. |
| 2011/0280517 A1* | 11/2011 | Fini ........................ G02B 6/262 29/428 |
| 2013/0236175 A1* | 9/2013 | Sethumadhavan ..... H04J 14/02 398/43 |
| 2013/0294737 A1* | 11/2013 | Dianov ............. G02B 6/02042 385/127 |
| 2014/0037244 A1* | 2/2014 | Sorin .................. G02B 6/0288 385/28 |
| 2014/0063592 A1 | 3/2014 | Ip |
| 2014/0064687 A1* | 3/2014 | Hoover ............. G02B 6/02042 385/126 |
| 2014/0125971 A1 | 5/2014 | Jiang et al. |
| 2014/0140694 A1* | 5/2014 | Zhou .................... H04J 14/021 398/44 |
| 2014/0161385 A1 | 6/2014 | Lessard et al. |
| 2015/0050019 A1 | 2/2015 | Sengupta |
| 2015/0063754 A1* | 3/2015 | Li .......................... G02B 6/262 385/50 |
| 2015/0078744 A1* | 3/2015 | Ito ....................... H04B 10/2581 398/43 |
| 2015/0086201 A1 | 3/2015 | Ryf et al. |
| 2015/0331181 A1* | 11/2015 | Chen .................... G02B 6/0365 385/124 |
| 2015/0338587 A1 | 11/2015 | Houbertz-Krauss et al. |
| 2016/0261351 A1 | 9/2016 | Raybon et al. |
| 2017/0123146 A1 | 5/2017 | Chen et al. |
| 2017/0155466 A1 | 6/2017 | Zhou et al. |
| 2017/0336559 A1* | 11/2017 | Bookbinder ......... G02B 6/4471 |
| 2017/0363823 A1* | 12/2017 | Mentovich ........... G02B 6/4206 |
| 2018/0375579 A1* | 12/2018 | Oda ....................... H04B 10/27 |
| 2019/0086618 A1 | 3/2019 | Shastri et al. |
| 2019/0140761 A1 | 5/2019 | Chan et al. |
| 2019/0226908 A1 | 7/2019 | Rao et al. |
| 2020/0257040 A1* | 8/2020 | Chen ........................ G02B 6/42 |
| 2020/0266894 A1 | 8/2020 | Shen et al. |
| 2020/0389248 A1 | 12/2020 | Goto |
| 2021/0250094 A1* | 8/2021 | Rekaya .................... G02B 6/14 |
| 2021/0341668 A1 | 11/2021 | Swanson et al. |

OTHER PUBLICATIONS

Chen et al, Universal Fiber for Short Distance Optical Communications, Jan. 2019, JOLT vol. 37 No 2, All Document. (Year: 2019).*

Chen et al., "Demonstration of Full System Reaches of 100G SR4, 40G sWDM, and 100G CWDM4 Transmissions over Universal Fiber", 2016 IEEE Photonics Conference (IPC), pp. 597-598, Oct. 2-6, 2016.

Chen et al., "Universal Fiber for Both Short-reach VCSEL Transmission at 850 nm and Single-mode Transmission at 1310 nm", 2016 Optical Fiber Communications Conference and Exhibition (OFC), pp. 1-3, Mar. 20-24, 2016.

"Protected Gold," Data Sheet, Pleiger Laseroptik GmbH + Co. KG, pp. 1-1, year 2012.

Kalavrouziotis et al., U.S. Appl. No. 16/928,037, filed Jul. 14, 2020.

U.S. Appl. No. 16/928,037 Office Action dated Sep. 20, 2021.

Saitoh et al., "Multicore Fibers for Large Capacity Transmission," Nanophotonics, vol. 2, No. 5-6, pp. 441-454, year 2013.

Batagelj et al., "Research Challenges in Optical Communications Towards 2020 and Beyond," Informacije MIDEM—Journal of Microelectronics, Electronic Components and Materials, vol. 44, No. 3, pp. 177-184, year 2014.

Ding et al., "On-Chip Grating Coupler Array on the SOI Platform for Fan-In/Fan-Out of MCFs with Low Insertion Loss and Crosstalk," Optics Express, vol. 23, No. 3, pp. 3292-3298, year 2015.

Optoscribe, "Fiber to Fiber Interconnects," Product Information, Optoscribe Website, pp. 1-3, year 2018, as https://web.archive.org/web/20181218102540/www.optoscribe.com/products/fiber-to-fiber-interconnects/.

U.S. Appl. No. 17/160,422 Office Action dated Nov. 16, 2021.

U.S. Appl. No. 16/928,037 Office Action dated Dec. 1, 2021.

U.S. Appl. No. 16/928,037 Office Action dated Mar. 28, 2022.

* cited by examiner

INTRA DATA CENTER AND INTER DATA CENTER LINKS USING DUAL-WAVELENGTH MULTIMODE/SINGLEMODE MULTI-CORE FIBER

FIELD OF THE INVENTION

The present invention relates generally to communications, and particular to devices for transmitting and receiving optical communication signals at high data rates and design and assembly methods thereof.

BACKGROUND OF THE INVENTION

Optical fibers optimized for particular applications in optical communications have been previously proposed in the patent literature. For example, U.S. Pat. No. 8,725,001 describes an optical data link that includes first and second pluralities of transmission devices, at least one of which is configured as an array. A multichannel transmission link has a first end connected to the first plurality of transmission devices and a second end connected to the second plurality of transmission devices so as to form a plurality of parallel transmission channels therebetween. The multichannel transmission link includes a multicore fiber with a plural of individual cores having a configuration matching the array configuration of the at least one plurality of transmission devices. The multicore fiber has an endface connected directly to the at least one plurality of transmission devices, with the individual cores of the multicore fiber aligned with respective devices in the at least one plurality of transmission devices. Further described are access networks and core networks incorporating transmission link comprising at least one span of a multicore fiber.

As another example, U.S. Pat. No. 9,678,270 describes a multimode optical fiber, with a graded-index core co-doped with at least fluorine F and germanium GeO2 and a refractive index profile with at least two α-values. For wavelengths comprised between 850 nm and 1100 nm, the disclosed multimode optical fiber has increased overfilled launch bandwidth and increased effective modal bandwidth over a continuous operating wavelength range greater than 150 nm.

U.S. Pat. No. 5,905,838 describes dual wavelength window optical fiber for optical communications in both the 1310 nm and 1550 nm transparency windows of the silica-based optical fiber. The dual window operation is enabled by a fiber design providing for nulled dispersion within a critically positioned wavelength range. Design provides for values of dispersion in both windows sufficiently low for desired per-channel bit rate, and, at the same time, sufficiently high to maintain effects of non-linear dispersion within tolerable limits for dense wavelength division and multiplication (DWDM) operation. Fiber fabrication and system design are described.

SUMMARY OF THE INVENTION

An embodiment of the present invention that is described hereinafter provides a universal multi-core fiber (UMCF) interconnect including multiple optical fiber cores and a shared cladding. Each of the optical fiber cores is configured to convey first optical communication signals having a first carrier wavelength using multi-mode propagation, and to convey second optical communication signals having a second carrier wavelength using single-mode propagation. The shared cladding encloses the multiple optical fiber cores.

In some embodiments, the first carrier wavelength is about 850 nm and the second carrier wavelength is about 1310 nm.

In some embodiments, the multiple optical fiber cores are disposed equidistantly over a circular perimeter of a cross-section of the UMCF interconnect.

In an embodiment, in at least one end of the UMCF interconnect, ends of the optical fibers terminate at an end facet that is configured to be connected to a multi-chip module (MCM).

In another embodiment, the end facet is optically butt-coupled to an electro-optical (EU) chip included in the MCM. In yet another embodiment, the end facet is an angled facet that folds an optical path toward a surface of an electro-optical (EU) chip included in the MCM.

In some embodiments, in at least one end of the UMCF interconnect, ends of the optical fibers terminate at an end facet that is configured to be connected to an optical-to-optical connector.

There is additionally provided, in accordance with another embodiment of the present invention, a method of producing a universal multi-core fiber (UMCF) interconnect, the method including enclosing, in a shared cladding, multiple optical fiber cores, each of the fiber cores configured to convey first optical communication signals having a first carrier wavelength using multi-mode propagation, and to convey second optical communication signals having a second carrier wavelength using single-mode propagation. End facets are formed, of the UMCF interconnect.

In some embodiments, enclosing the multiple optical fiber cores in the shared cladding includes forming, in the shared cladding, circular portions around the optical fiber cores, the circular portions having a refractive index the differs from a remaining portion of the shared cladding.

There is further provided, in accordance with another embodiment of the present invention, a method for optical communication, including conveying first optical signals in multiple first optical fiber cores of a first universal multi-core fiber (UMCF) interconnect, wherein each of the first optical fiber cores is embedded in a first shared cladding enclosing the multiple first optical fiber cores, and wherein the first optical communication signals have a first carrier wavelength and are conveyed using multi-mode propagation. In a second UMCF interconnect that is identical to the first UMCF interconnect, second optical communication signals are conveyed in multiple second optical fiber cores, wherein each of the second optical fiber cores is embedded in a second shared cladding enclosing the multiple second optical fiber cores, and wherein the second optical communication signals have a second carrier wavelength and are conveyed using single-mode propagation.

In some embodiments, conveying the first optical communication signals includes transferring the first optical communication signals between network devices located at a same data center, and conveying the second optical communication signals includes transferring the second optical communication signals between network devices located at different data centers.

The present invention will be more fully understood from the following detailed description of the embodiments thereof, taken together with the drawings in which:

DETAILED DESCRIPTION OF EMBODIMENTS

Overview

Modern data center (DC) networks typically use different types of optical fiber interconnects as data links inside a DC (intra-DC interconnects) and between DCs (inter-DC interconnects).

One way to construct a conventional intra-DC optical network is to connect multiple network devices, such as switches, to one another by optical multi-mode (MM) fiber interconnects. Such MM fiber interconnects would transmit data over short distances inside the DC, on the order of 100 meters, over a carrier wavelength of 850 nm. For example, a bundle of MM fibers that connect a pair of switches may optically transmit and receive high data rates, e.g., on the order of 100 GHz.

An inter-DC network, on the other hand, typically involves transmitting data between DCs at ultra-high data rates (e.g., on the order of 1 THz) over longer distances, on the order of 10 kilometers. One way to implement such an inter-DC network is using single-mode (SM) fiber interconnects, typically with a carrier wavelength of 1310 nm for improved data fidelity, or reduced bit error rate, compared to that obtainable with 850 nm MM data links.

MM or SM fibers may be coupled to a switch using pluggable I/O electro-optical modules fitted on the switch's panel, or directly coupled to electro-optic circuits inside the switch, such as to multi-chip modules (MCM). In the context of the present disclosure, all possible types of such fiber coupling are collectively described as "connecting a fiber interconnect to a network device." Regardless of the connecting scheme being used (e.g., via direct connection or a plug), the above-described implementation would require a large number of different types of optical MM and SM fibers, resulting in a shortage of physical space inside data centers and complex interconnect schemes.

Embodiments of the present invention provide a unified optical fiber interconnect solution, which is applicable to both intra-data center and inter-data center networks. To this end, embodiments of the disclosed interconnect solution provide a single design for a dual-wavelength dual-mode multi-core fiber (SM/MM MCF) interconnect. Using this single fiber link design for multiple applications in various data center topologies can drastically simplify the optical cabling of data centers, and at the same time meet the required I/O density inside data centers as well as traffic volume between data centers.

The disclosed dual-wavelength dual-mode SM/MM MCF is therefore named hereinafter "universal MCF (UMC)." In particular, the disclosed UMCF is designed and configured to replace both SM fibers for 1310 nm transmission, and MM fibers for 850 nm transmission, in data center environments. In this way, the disclosed UMCF provides unified interconnect infrastructure for both intra-data center communications at 850 nm, and for inter-data center communications at 1310 nm.

In an embodiment, the disclosed. UMCF includes: (i) multiple optical fiber cores, each of the optical fiber cores configured to convey first optical communication signals having a first carrier wavelength (e.g., about 850 nm) using multi-mode propagation, and to convey second optical communication signals having a second carrier wavelength (e.g., about 1310 nm) using single-mode propagation, and (ii) a shared cladding enclosing the multiple optical fiber cores.

The disclosed UMCF can be designed to connect to various transmit and receive geometries of network devices, such as geometries of surface emitting laser (e.g., VCSELs) arrays and of avalanche photodiode (APD) arrays, respectively.

In one embodiment, the UMCF interconnect is configured in an 8-core octagonal geometry, as described below. In all embodiments, each core of the disclosed UMCF interconnect configured to support both MM transmission and SM transmission, which minimizes insertion losses when coupled at 850 nm to a standard OM4 model of an MM fiber or when coupled at 1310 nm to an SMF-28 model SM of a fiber. In an embodiment, the UMCF geometry is designed to accommodate direct butt-coupling of the UMCF to either transmit devices (e.g., to a VCSEL array on chip), or receive devices (e.g., to an APD array on chp). For example, the disclosed UMCF' cross section may comprise a circular array of fiber cores so as to match a circular array of VCSELs. In another embodiment, a fan-in/fan-out assembly is used for connecting the UMCF to conventional linear arrays, whose fiber connections are based on standardized single-core OM1-based multi-fiber connector assemblies for 850 nm, and in standardized SMF-28-based multi-fiber connector assemblies for 1310 nm, as described below.

In general, the two opposing ends of the disclosed UMCF can be configured differently so as to connect to any type of network device on either end. In particular, the opposing facets of the UMCF interconnect can be configured in various ways, including, for example, being cleaved at a right angle, or at an oblique angle (to fold an optical cath), or be polished or coated with reflective coating or a thin-film dielectric filter, and so on.

In an embodiment, APDs are used within the receive circuitry of the link in order to compensate for intrinsic insertion losses incurred by using the UMCF, e.g., via usage of fan-in/fan-out assemblies, or other types of connectors. Sensitivity improvements of up to 6 dB can be realized with a solution using APDs versus a solution using non-amplified photodiodes (PD).

When compared to conventional ribbon technology that uses numerous stand-alone single-core MM and SM fibers, the disclosed UMCF interconnect may enable an increase in data-traffic rates between network devices inside data centers and between network devices of different data centers, while decreasing interconnect complexities and maintenance efforts of such DC networks.

System Level Description

Figure 1:
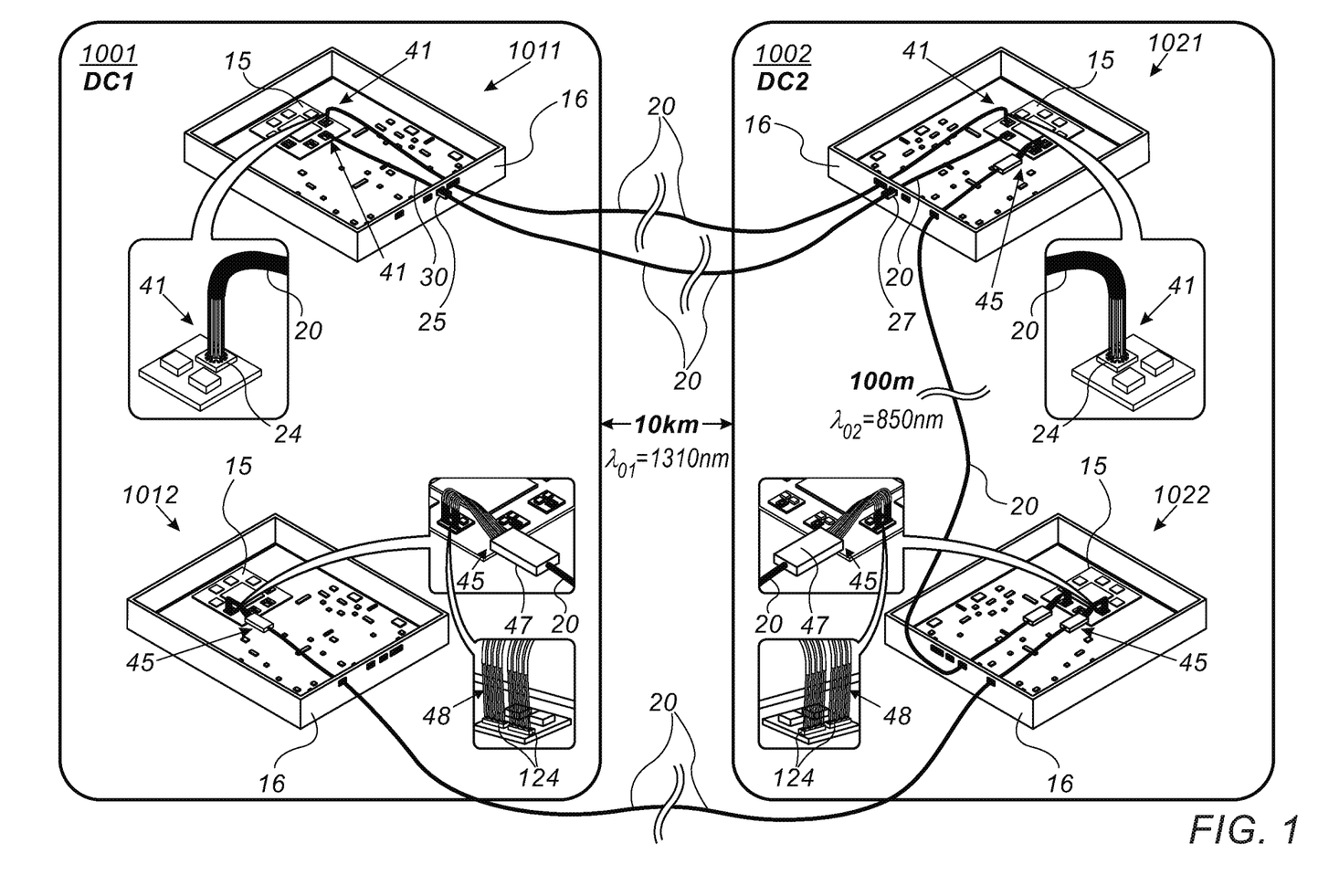
FIG. 1 is a schematic, pictorial isometric view of an intra-data center (DC) environment and an inter-DC environment, each comprising universal multi-core fiber (UMCF) interconnects, in accordance with an embodiment of the present invention.

FIG. 1 is a schematic, pictorial isometric view of an intra-data center (DC) environment and an inter-DC environment comprising universal multi-core fiber (UMCF) interconnects 20, in accordance with an embodiment of the present invention.

In the shown embodiment, two data centers, DC1 1001 and DC2 1002, are located approximately 10 kilometers apart. As seen, data center 1001 comprises network switches 1011 and 1012, and data center 1002 comprises network switches 1021 and 1022. Each switch enclosure comprises a panel 16 that accepts one or more UMCF 20 interconnects to link the switch, either using a plug or direct coupling, to another switch.

Switches located in different data centers, such as switches 1011 and 1021, can communicate data using optical signals conveyed by SM guided waves that propagate in a UMCF 20 interconnect with a carrier wavelength $\lambda_{01}$=1310 nm. Switches located in a same data center, such as switches 021 and 1022 that are shown approximately 100 meters apart, communicate data using optical signals conveyed by MM waves that propagate in a UMCF 20 interconnect with a carrier wavelength $\lambda_{02}$=850 nm. As seen, all switches are connected externally to their enclosure using the same UMCF 20 interconnects (although the coupling method for network devices at UMCF ends may vary, as described below).

In the shown embodiment, a multi-chip module (MCM) 15 is assembled inside each switch enclosure. MCM 15 comprises satellite electro-optical (EO) chips 24 and 124 that undertake the electro-optical conversion. Satellite EO chips 24 and 124 include, for example, lasers, modulators, and respective driving electronics. Any type of electro-optical chip could work in this concept (VCSEL, Silicon Photonics, III-V etc.), where the optical I/O layout of an EO chip 24 efficiently matches a respective UMCF 20 core topology (seen in FIG. 2) in order to ensure efficient direct optical coupling between the two. The optical I/O layout of an EO chip 124 matches a fan-in fiber bundle, as described below.

Each panel 16 of switches 1011 and 1021 comprises one optical-to-optical connector (25, 27) to mate the external fiber infrastructure of UMCFs 20 to MCM 15 inside the enclosure. Connectors 25 and 27 are each all-optical connector types, coupling fibers directly on both sides, without any electro-optical conversion, and without resorting to direct coupling of the external UMCFs 20 interconnects. In this way, a switch can be provided that is ready to accept a UMCF 20 interconnect into a connector of the switch. Moreover, using optical-to-optical connector 25 allows, for example, assembly inside an enclosure of a switch for any type of fibers 30 other than UMCF 20.

In an embodiment, two different kinds of panel optical-to-optical connectors may be used:
  Within switch 1011 enclosure: UMCF to multi-fiber push on (MPO) connector (or any other non-UMCF multi-fiber 30 connectors, where multi-fiber 30 is permanently coupled to an MCM 15)
  Within switch 1021 enclosure: UMCF 20 to UMCF 20 connector, where an internal UMCF 20 is permanently coupled to an MCM 15

Both types of connectors are smaller in size than existing pluggable modules, since connectors (25, 27) are purely optical and do not require a bulky cage typical of other types of pluggable modules.

FIG. 1 further schematically shows direct optical coupling approaches 41 and 45 of a multi-core fiber (MCF) 20 to a multi-chip module (MCM') 15 inside the network switch (i.e., approaches that do not use a panel connector).

In direct butt-coupling approach 41, the UMCF is folded at a right angle such that its facet directly faces the EO chip. As can be seen in FIG. 1, and more clearly in FIG. 2, the MCF core topology is that of a circular array of electro-optical chip 24 to achieve adequate optical power coupling. In this case, the electro-optical chip resembles an 8-channel VCSEL disposed on EO chip 24 in a circular arrangement. Coupling light directly from satellite EO chips 24 to the UMCFs clearly increases the optical I/O density on the MCM side, since the optical cores are very densely arranged.

Coupling approach 45 couples UMCF 20 to the EO chip 124 using a fan-in/fan-out coupler 47. As seen in switches 1012, 1021, and 1022, some of the UMCFs 20 are terminated in a fan-out which splits the cores of the UMCF into individual regular single core fibers 48.

As seen in the close-up views of FIG. 1, electro-optical chip 124 (mounted on the satellite chip) does not come with UMCF-compatible optical I/O topology, and hence cannot be directly interfaced to the UMCF. For this reason, a fan-out 47 is included in the enclosure. The fan-out is an off-the-shelf component that can split the MCF core into individual single-core fibers. After this step, the individual fibers are coupled to electro-optical chip 124 in the required manner without having to consider optical I/O topology. While this variation cannot increase the optical I/O density on the MCM side, it can still assist with alleviating panel density, while offering compatibility with electro-optical chips that are not MCF compatible.

The disclosed use of UMCFs in network devices is not limited to a specific UMCF coupling approach. Any coupling approach that ensures good matching between the optical I/O of an electro-optical chip, such as of chips 24 or 124, and the UMCF, can be used.

The isometric view shown in FIG. 1 is chosen purely for the sake of conceptual clarity. While the shown embodiment is of a switch enclosure, the disclosed layout holds also for MOMs inside an NIC enclosure or a server. While the shown embodiment has few MCF 20 interconnects, actual devices may include a larger number of MCFs 20, for example to interconnect multiple satellite FO chips 24 of different switches.

Elements of the switch that are not mandatory for understanding the disclosed techniques, such as electrical amplification stages, are omitted from the figure for simplicity of presentation.

Finally, while the embodiments disclosed in FIG. 1 are for MCM systems, the disclosed techniques are applicable, mutatis mutandis, to embedded optical modules (EOM) (e.g., Coalition for On-Board Optics—COBO) which, unlike MCMs, are placed on the main board rather than the main ASIC substrate. For such modules, MCFs could be still used to connect the EOM to the panel.

Universal Multi-Core Fiber (UMCF)

Figure 2:
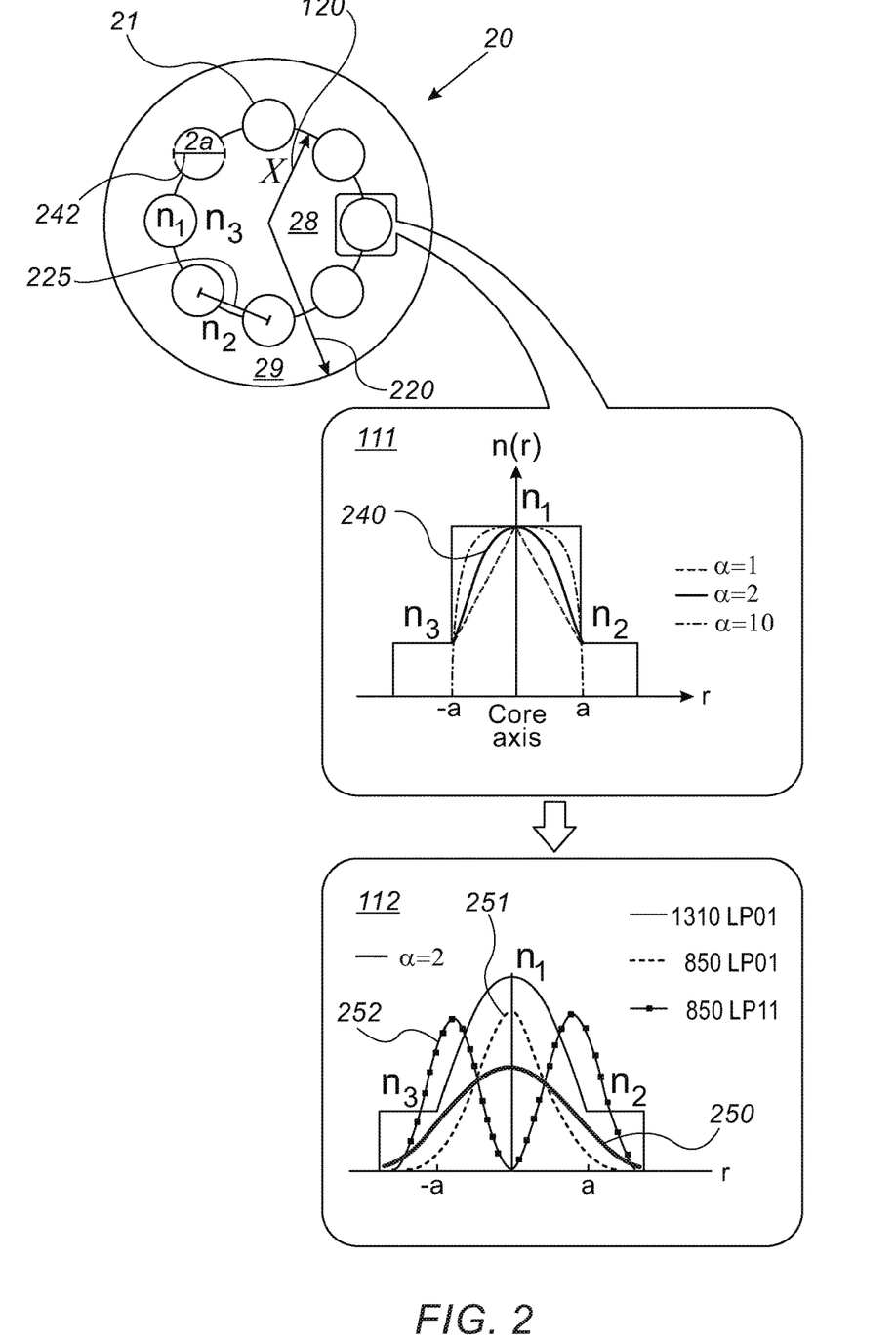
FIG. 2 schematically shows a universal multi-core fiber (UMCF) design and supported single-mode/multi-mode (SM/MM) guided waves, in accordance with an embodiment of the present invention.

FIG. 2 schematically shows a universal multi-core fiber (UMCF) 20 design and supported single-mode/multi-mode (SM/MM) guided waves, in accordance with an embodiment of the present invention. As seen (in the cross-sectional view), UMCF 20 is made of eight identical cores 21 (e.g., laid out in a circular 8-core layout) each having a refractive index $n_1$, and a core-diameter 2a, 242. The cladding of each core may be divided into an inner circle portion 28 having refractive index $n_3$ located internally to a circular portion 29 having refractive index $n_2$. In some embodiments, however, $n_3=n_2$.

As seen, the multiple optical fiber cores 21 are disposed equidistantly over the circular perimeter of the cross-section of UMCF 20. An inter-core spacing 225 of the 8-core UMCF 20 is given by $\pi X/4$, X being a radius 120. By adjusting radius X, inter-core spacing 225 can be made to match the inter-element spacing of the octagonal transmit and receive arrays used in the link (e.g., of VCSELs or APDs of an EO chip 24).

A total diameter 220 of UMCF 20 can be adjusted to meet a footprint requirement within the switch and/or other data center constraints.

Inset 111 shows three possible optical designs of a core 21, each having graded refractive index profiles 240 marked as $\alpha=1$, $\alpha=2$, and $\alpha=10$, which are derived as described below. A specific profile may be selected to, for example, support a given number (two or more) guided modes at a wavelength of 850 nm and single guided mode at a wavelength of 1310 nm.

Another design consideration is a level of crosstalk between guided waves of neighboring cores, which has to be below a prespecified value. In general, however, while described below, crosstalk considerations, due to the short distances involved, have limited effect on design.

Inset 112 shows an embodiment in which an $\alpha=2$ graded refractive index profile gives a core that supports two guided modes (depicted by envelopes LP01 251 and LP11 252) at 850 nm, and a guided LP01 mode 250 at 1310 nm. LP stands for linearly polarized guided mode of a radially symmetric core. The lowest-order modes (LP01 250 and LP01 251) have intensity profiles which may be similar to that of a Gaussian beam.

A UMCF interconnect can be generally configured with N-cores, with each core supporting a single guided mode at 1310 nm, or k-guided modes at 850 nm. Therefore, in some embodiments, the capacity of a UMCF interconnect can be defined by the set of numbers (N, and its optical fidelity defined by crosstalk values in dB. Different designs can have different (N, k) values and maximal useful lengths derived from, for example, its crosstalk values, as described below.

In an embodiment, considering the above circular array, a center core can be added at the origin of circle portion 28 (e.g., a (N+1)'th core in case of an N-core configuration). However, care has to be taken that the additional center core does not cause crosstalk between the circularly arranged cores.

Moreover, other UMCF geometries may be considered, such as UMCF interconnect having any other two-dimensional array of cores embedded in a cladding.

UMCF Design Method

Figure 3:
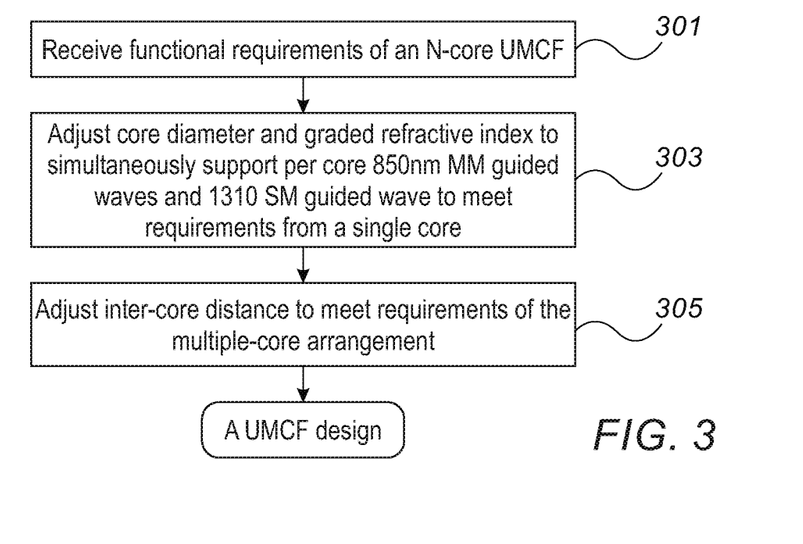
FIG. 3 is a flow chart schematically describing a universal multi-core fiber (UMCF) design method of the UMCF shown in FIG. 2, in accordance with an embodiment of the present invention.

FIG. 3 is a flow chart schematically describing a universal multi-core fiber (UMCF) 20 design method of the UMCF shown in in accordance with an embodiment of the present invention. The process begins at a requirement setting step 301, by setting requirements of UMCF 20, such as: (i) the number (N) of cores, each of which able to support a single guided mode at 1310 nm, and the number (k) of guided modes at 850 nm, (ii) arrangement of cores, such as in a circular array, (iii) optical fidelities required defined by specifying maximal crosstalk values in dB at 850 nm and 1310 nm between modes of different cores, and (iv) total diameter 220 of the UMCF.

At a step 302, a design is made of the single core. Assuming, for simplicity, that a useful design parameter is the index discrimination factor, Δ, given by:

$$\Delta = \frac{(n_1^2 - n_2^2)}{2n_1^2} \qquad \text{Eq. 1}$$

Typical cladding material of fused silica has a refractive index value in the range of 1.46.

Candidate graded refractive index profiles 240, n(r), are derived, for example, using:

$$n(r) = n_1\sqrt{1 - 2\Delta\left(\frac{r}{a}\right)^\alpha} \quad r \leq a \qquad \text{Eq. 2}$$

with $\alpha>0$ (e.g., $\alpha=2$).

For example, by adjusting the fiber core radius 21, a, to be 15.35 um, and the index discrimination factor, Δ, to be Δ=0.012, the UMCF can be designed to yield the mode field diameter (MFD) of the fundamental mode LP01 at 1310 nm of width of 10 um that is optimized from, a coupling efficiency point of view. At the same time, the insertion loss when coupling into an OM4 fiber can be made no greater than 1 dB at 850 nm. Thus, this fiber can perform well at both 1310 nm and 850 nm wavelengths with minimal insertion loss. Typical k values are on the order of 800.

At a multi-core design step 303, a design of the multiple core arrangement is made. A radius X is selected to have an inter-core spacing 225, for example N=8 of cores that are arranged circularly, with an inter-core distance 225 of approximately 60 um, and maximal crosstalk of −50 dB per 1310 SM mode, and −20 dB per 850 nm modes.

As used herein, the terms "about" and "approximately" for any numerical value or range indicate a suitable dimensional tolerance that allows the part or collection of components to function for its intended purpose as described herein. More specifically, "about" and "approximately" may refer to the range of values ±20% of the recited value, e.g. "approximately 90%" may refer to the range of values from 71% to 99%.

Step 305 includes further adjustments of the total diameter of the UMCF and of radius X, 120, to match the arrays of VCSELs or APDs on EU chins 24, to minimize coupling losses.

The design process shown in FIG. 3 is brought purely by way of example. In practice, additional steps may be performed, including steps run iteratively on a processor. For example, a processor may be applied to optimize insertion loss vs. inter-core crosstalk, taking into account material wavelength-dispersion effects.

System Level Embodiments of UMCF Links

Figure 4A:
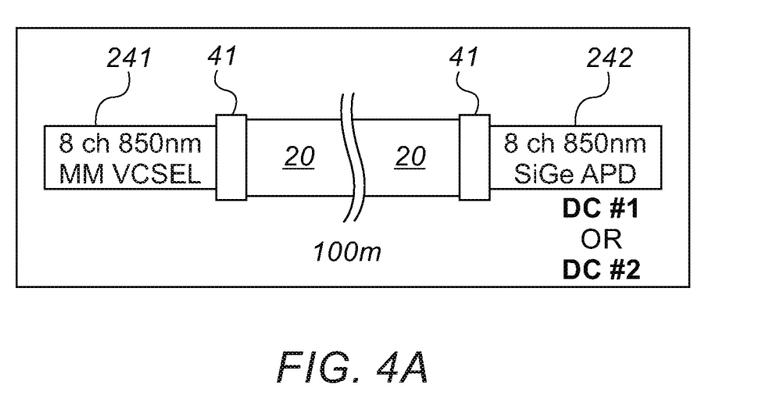
FIGS. 4A and 4B are schematic, pictorial block diagrams of an intra-data center (DC) environment and an inter-DC environment, respectively, comprising universal multi-core fibers (UMCFs) that are directly coupled to network devices, in accordance with some embodiments of the present invention.
Figure 4B:
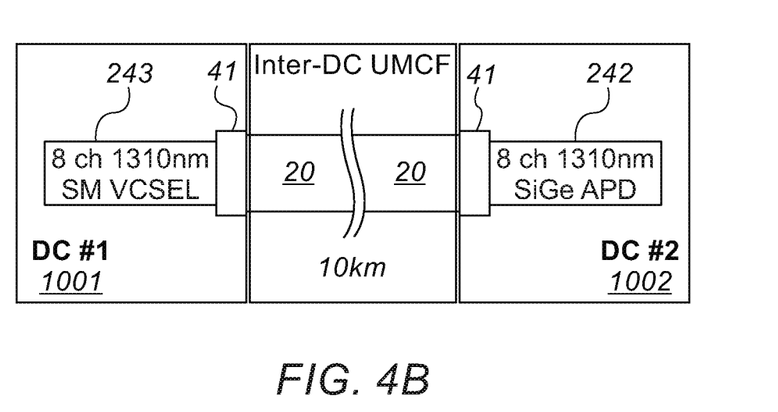

FIGS. 4A and 4B are schematic, pictorial block diagrams of an intra-data center (DC) environment and an inter-DC environment, respectively, comprising universal multi-core fibers (UMCFs) 20 that are directly coupled (41) to network devices, in accordance with some embodiments of the present invention.

FIG. 4A can represent an embodiment of UMCF 20 used inside a data center, such as data centers 1001 or 1002. In this embodiment, one end of a UMCF 20 interconnect is butt-coupled to an octagonal array 241 of VCSELs transmitting at 850 nm. The other end of the UMCF 20 interconnect is butt-coupled to an octagonal array 242 of SiGe APDs that detect the 850 nm signals.

FIG. 4B shows an embodiment that uses direct optical (e.g., butt-coupling) approach 41 to EO chips 24, as shown in FIG. 1. In this embodiment, switches 1011 of DC1 and 1021 of DC2 are linked using a UMCF 20 interconnect coupled to EO chips 24. One end of a UMCF 20 interconnect is butt-coupled to an octagonal array 243 of VCSELs transmitting at 1310 nm in switch 1011. The other end of the UMCF 20 interconnect is butt-coupled to an octagonal array 244 of SiGe APDs that detect the 1310 nm signals in switch 1021.

The embodiments shown in FIGS. 4A and 4B are brought by way of example. Other elements and direct coupling methods may be used. For example, the shown SiGe APDs can be replaced by InGaAs PDs for the receive circuitries to measure optical signals conveyed either at 850 nm or 1310 nm. Another direct coupling approach may be used, in which the optical path is folded at the UMCF end by cleaving the UMCF end facet at an oblique angle and half silvering the cleaved facet.

Figure 5:
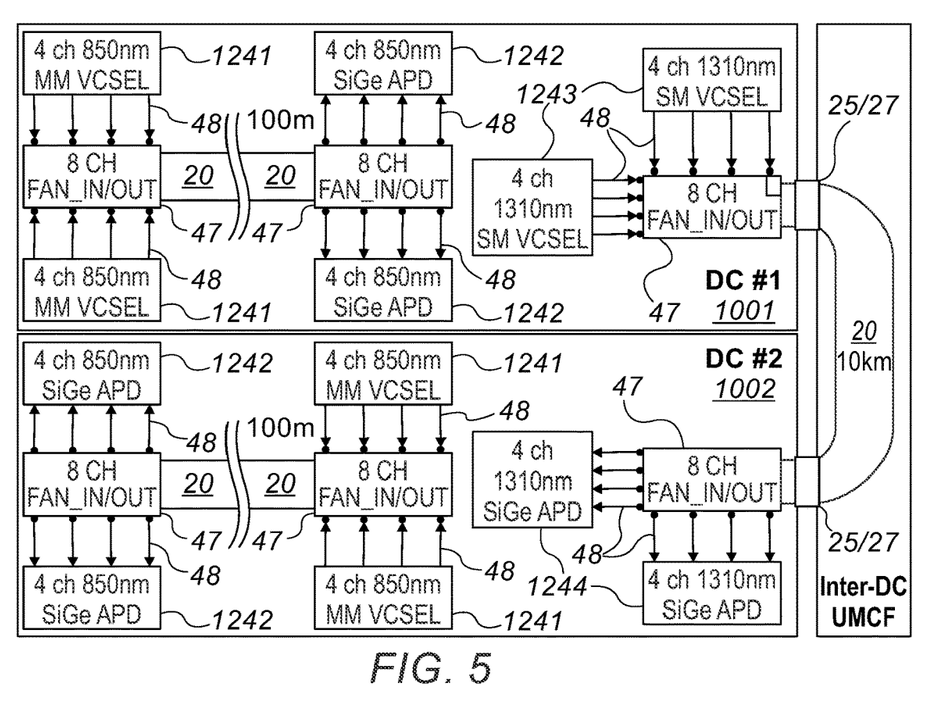
FIG. 5 is a schematic, pictorial block diagram of intra- and inter-data center (DC) environments comprising universal multi-core fiber (UMCF) interconnects, in accordance with an embodiment of the present invention.

FIG. 5 is a schematic, pictorial block diagram of intra- and inter-data center (DC) environments comprising universal multi-core fiber (UMCF) 20 interconnects, in accordance with an embodiment of the present invention.

FIG. 5 shows an implementation using fan-in/fan-out assemblies 47 to accommodate four-channel transmit and receive arrays that are interfaced with MT assemblies 48 in the fan-in/fan-out 47 elements. As seen, for intra-data center communication at 850 nm, e.g., to convey signals at 850 nm between the two switches of a same data center, EO chips 124 include two linear arrays of elements such as VCSELs (1241) or APDs (1242) that are each coupled to UMCF 20 using a fan-in-fan-out coupler 47.

UMCF optical-to-optical connectors 25 or 27 (25/27) are used at the interfaces to/from the inter-DC UMCF 20. In the shown embodiment, four-channel transmit and receive arrays are interfaced with MT assemblies 48 in the fan-in/fan-out 47 elements such as VCSELs (1243) or ADDS (1244) for inter data center communication at 1310 nm.

Figure 6:
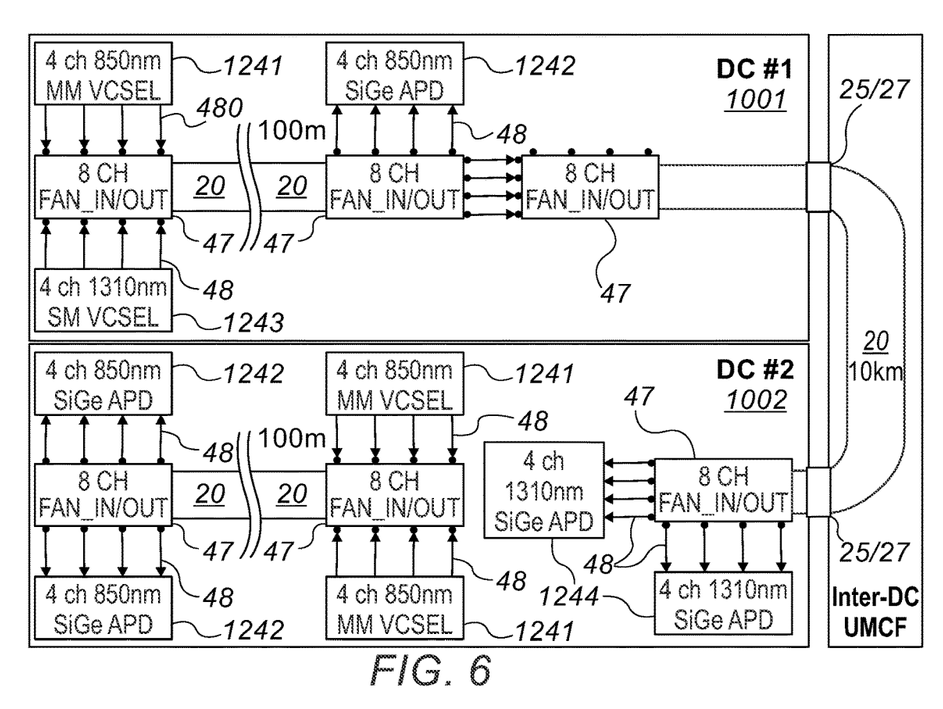
FIG. 6 is a schematic, pictorial block diagram of intra- and inter-data center (DC) environments comprising universal multi-core fiber (UMCF) interconnects, in accordance with another embodiment of the present invention.

FIG. 6 is a schematic, pictorial block diagram of intra- and inter-data center (DC) environments comprising universal multi-core fiber (UMCF) 20 interconnects, in accordance with another embodiment of the present invention.

FIG. 6 shows an implementation using fan-in/fan-out assemblies 47 to accommodate four-channel transmit and receive arrays that are interfaced with MT assemblies 48 in the fan-in/fan-out 47 elements. As seen, fan-in/fan-out 47 of data center 1011 includes 850 nm and 1310 nm that are interfaced with MT assemblies 48 in the fan-in/fan-out elements 47, for intra-data center communication and inter-data center communication, e.g., to convey signals at 850 nm between the two switches of a same data center or signals at 1310 nm between data centers. CO chips 124 include two linear arrays of elements such as VCSELs (1241) or APDs (1242) that are each coupled to UMCF 20 using a fan-in-fan-out coupler 47. VCSELs (1243) or APDs (1244) are coupled for inter-data center communication at 1310 nm. Again, UMCF optical-to-optical connectors 25 or 27 (25/27) are used at the interfaces to/from the inter-DC UMCF 20.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system in a data center, the system comprising:
one or more first electro-optical devices, configured to transmit or receive first optical communication signals having a first carrier wavelength of about 850 nm for internal communication within the data center;
one or more second electro-optical devices, configured to transmit or receive second optical communication signals having a second carrier wavelength of about 1310 nm for external communication with a remote data center;
an optical connector for interfacing with the remote data center; and
a universal multi-core fiber (UMCF) interconnect, comprising:
multiple optical fiber cores configured to simultaneously (i) transfer one or more of the first optical communication signals among the first electro-optical devices, using multi-mode propagation, for the internal communication and (ii) transfer one or more of the second optical communication signals between the second electro-optical devices and the connector, using single-mode propagation, for the external communication; and
a shared cladding enclosing the multiple optical fiber cores; and
wherein each of the multiple optical fiber cores are disposed equidistantly over a circular perimeter of a cross-section of the UMCF interconnect.

2. The system according to claim 1, wherein in at least one end of the UMCF interconnect, ends of the optical fiber cores terminate at an end facet that is configured to be connected to a multi-chip module (MCM).

3. The system according to claim 2, wherein the end facet is optically butt-coupled to an electro-optical (EO) chip comprised in the MCM.

4. The system according to claim 2, wherein the end facet is an angled facet that folds an optical path toward a surface of an electro-optical (EO) chip comprised in the MCM.

5. The system according to claim 1, wherein in at least one end of the UMCF interconnect, ends of the optical fiber cores terminate at an end facet that is configured to be connected to an optical-to-optical connector.

6. A method for optical communication in a data center, the method comprising:
using one or more first electro-optical devices, transmitting or receiving first optical communication signals having a first carrier wavelength of about 850 nm for internal communication within the data center;
using one or more second electro-optical devices, transmitting or receiving second optical communication signals of about 1310 nm having a second carrier wavelength for external communication with a remote data center; and using a universal multi-core fiber (UMCF) interconnect that comprises multiple optical fiber cores and a shared cladding enclosing the multiple optical fiber cores, simultaneously (i) transferring one or more of the first optical communication signals among the first electro-optical devices, using multi-mode propagation, for the internal communication and (ii) transferring one or more of the second optical communication signals between the second electro-optical devices and a connector, using single-mode propagation, for the external communication; and wherein each of the multiple optical fiber cores are disposed equidistantly over a circular perimeter of a cross-section of the UMCF interconnect.

* * * * *